Dec. 31, 1940.  C. E. RAHAUSER  2,226,979
ICE CREAM MAKING APPARATUS
Filed Feb. 17, 1937  5 Sheets-Sheet 1
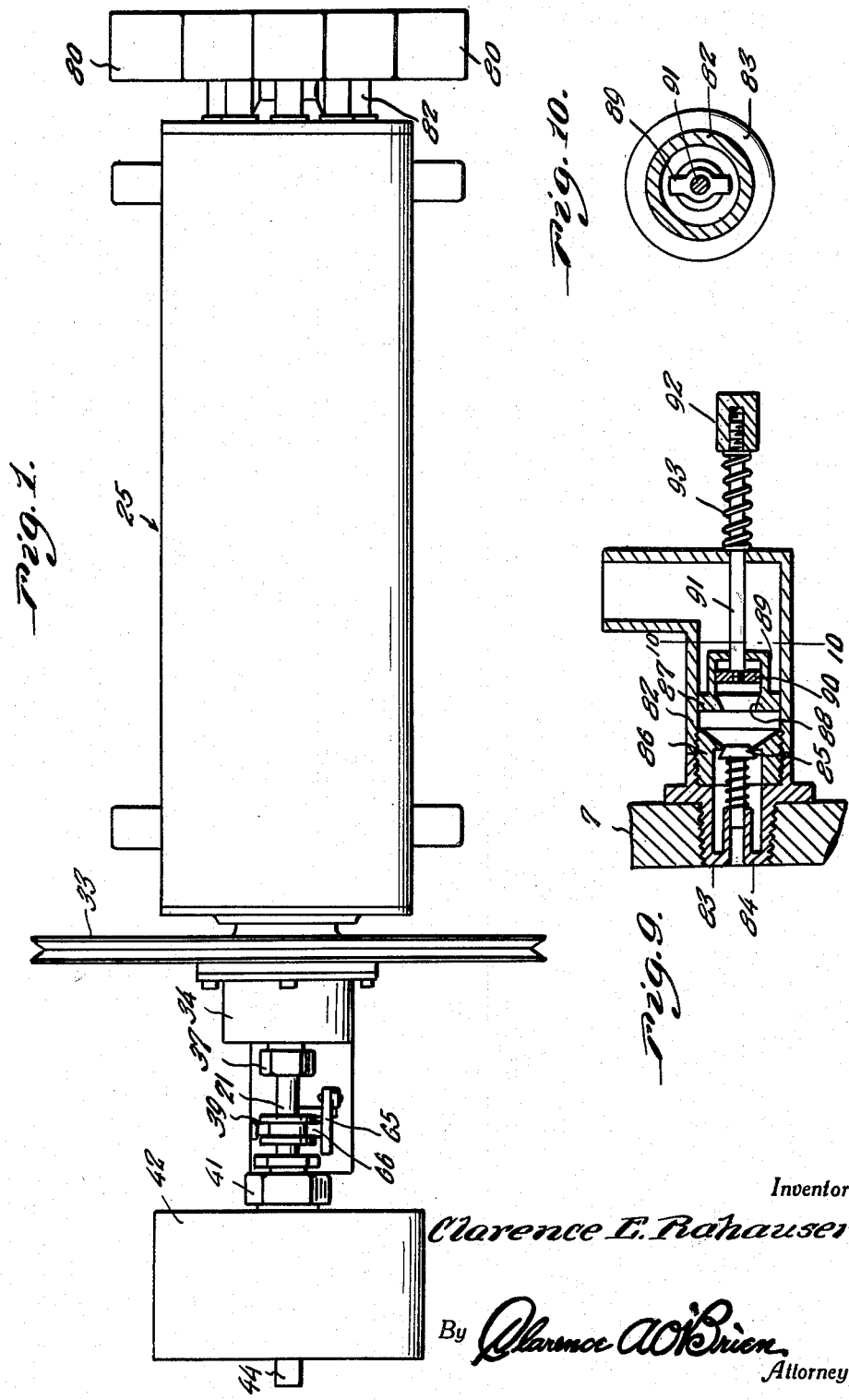
Inventor
Clarence E. Rahauser
By Clarence A. O'Brien
Attorney Dec. 31, 1940. C. E. RAHAUSER 2,226,979
ICE CREAM MAKING APPARATUS
Filed Feb. 17, 1937 5 Sheets-Sheet 2
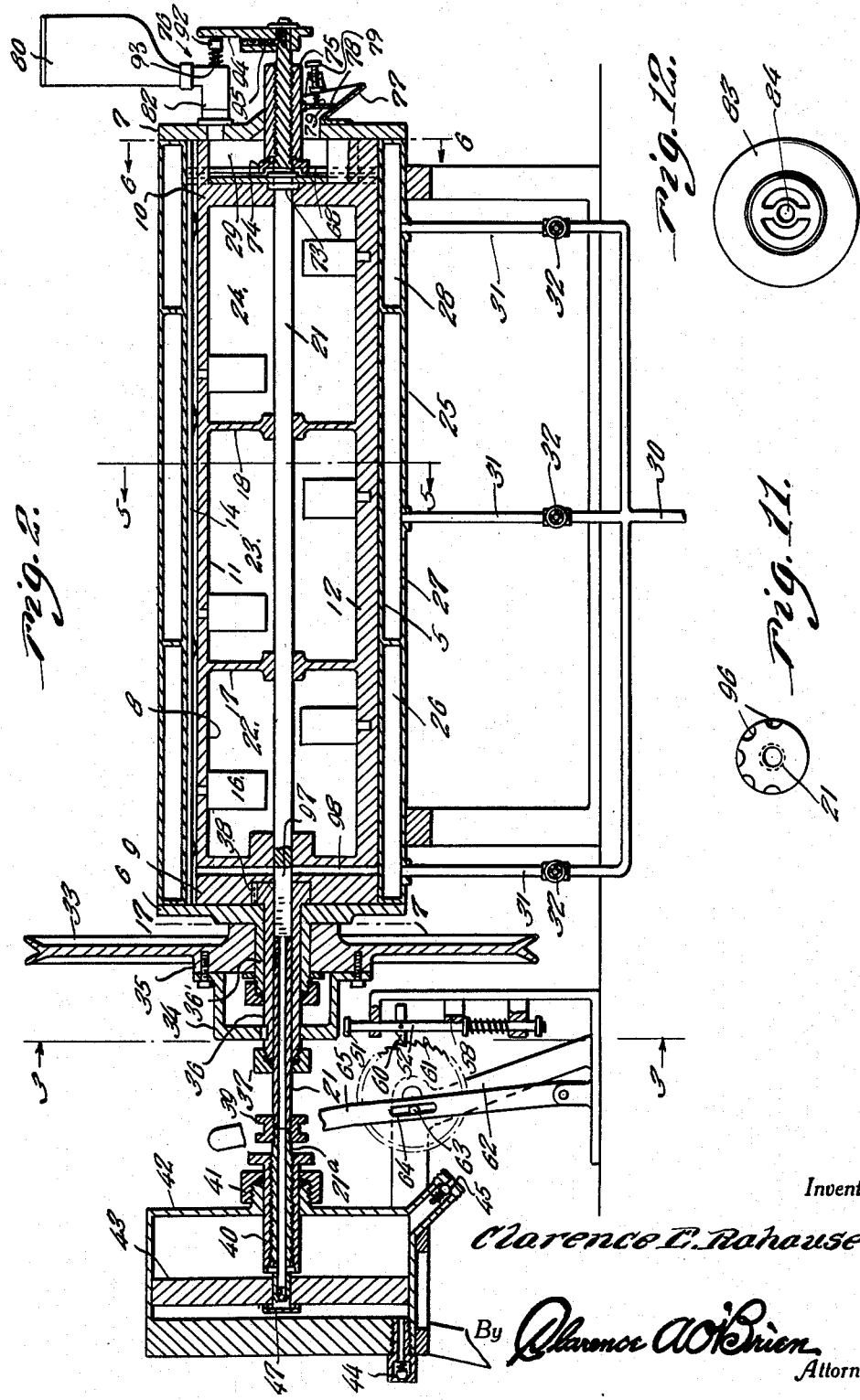
Inventor
Clarence E. Rahauser
By Clarence A. O'Brien
Attorney

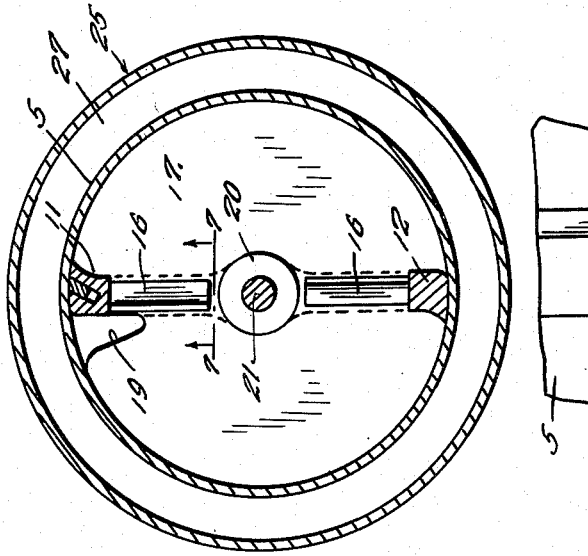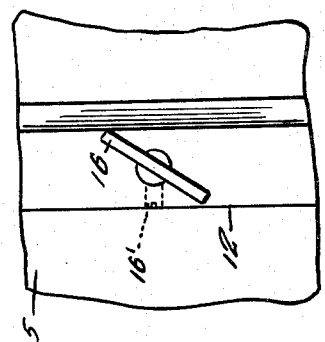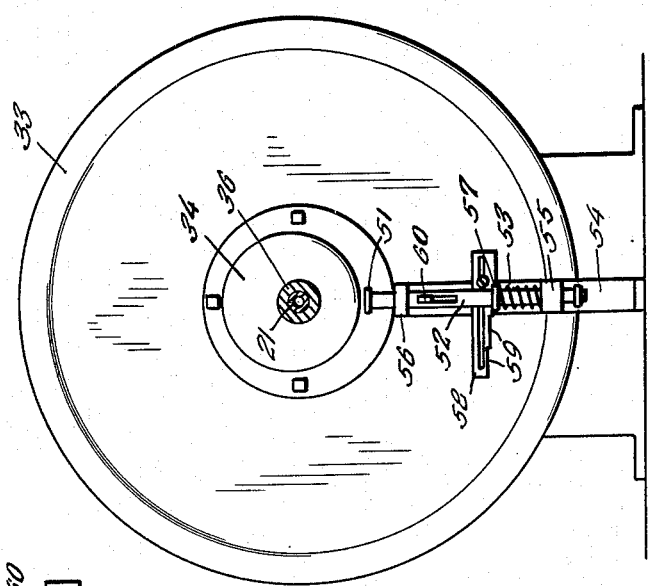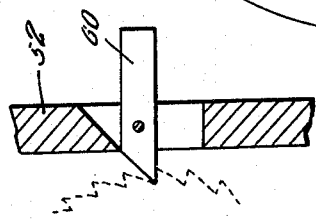

Dec. 31, 1940.  C. E. RAHAUSER  2,226,979
ICE CREAM MAKING APPARATUS
Filed Feb. 17, 1937   5 Sheets-Sheet 4
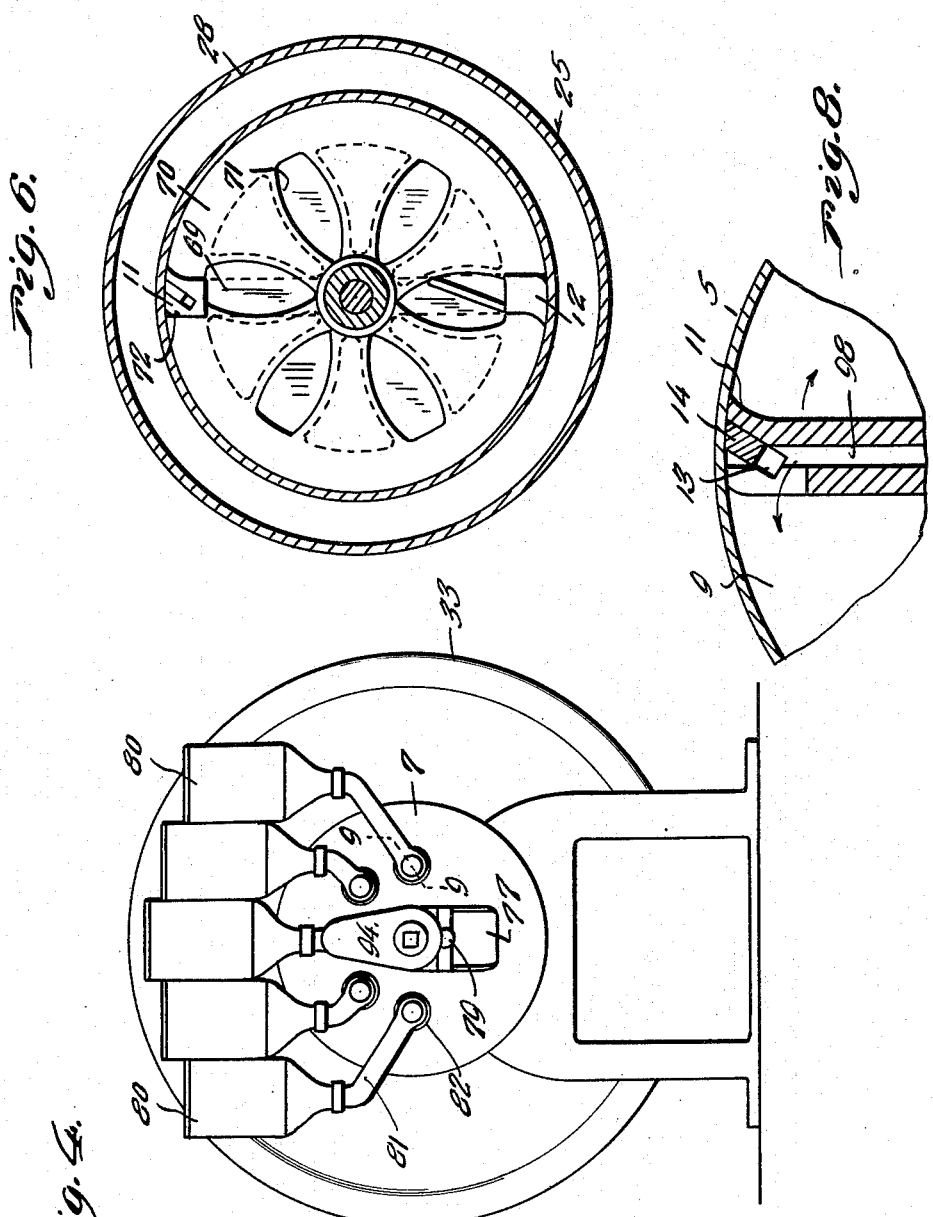
Inventor
Clarence E. Rahauser
By Clarence A. O'Brien
Attorney

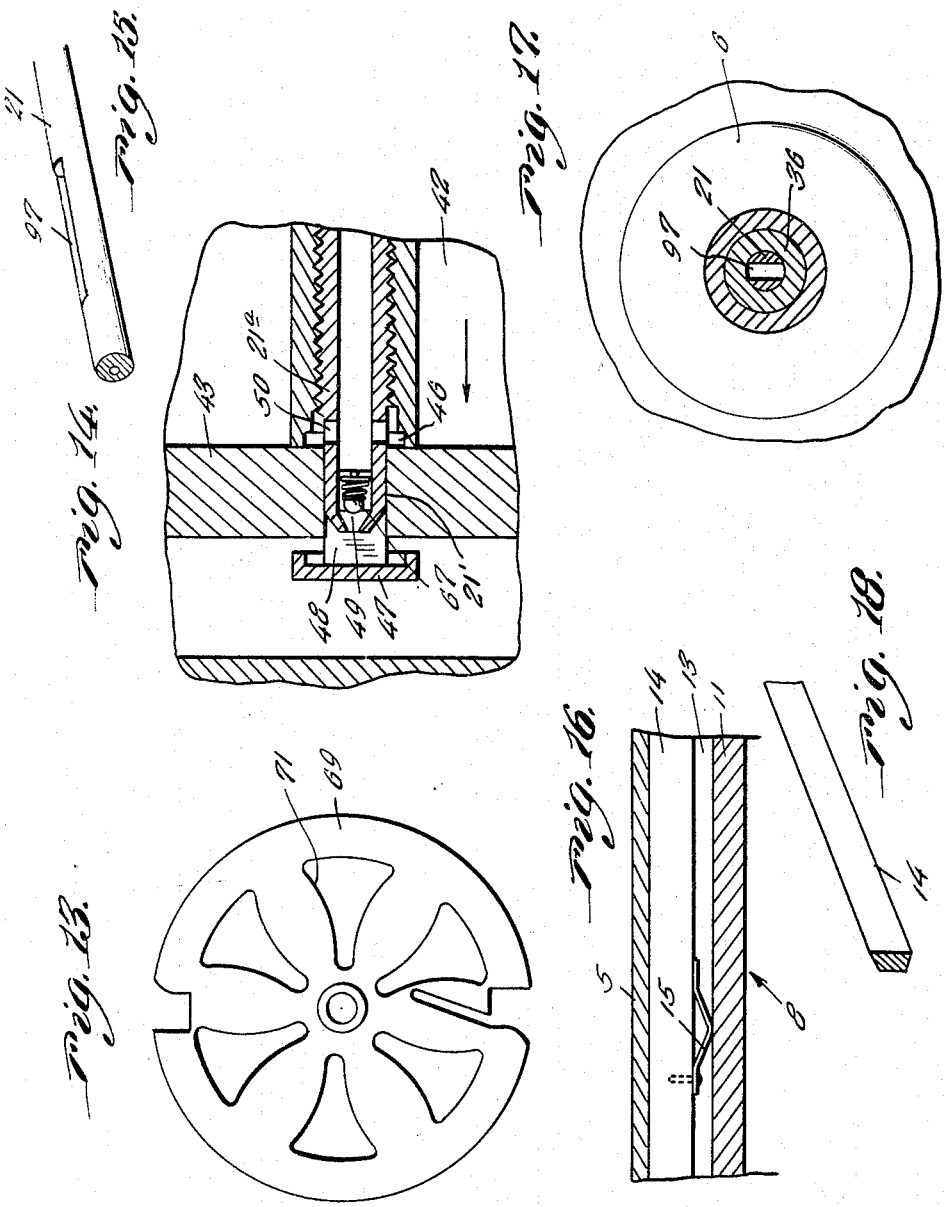

Patented Dec. 31, 1940

2,226,979

UNITED STATES PATENT OFFICE 2,226,979

ICE CREAM MAKING APPARATUS

Clarence E. Rahauser, York, Pa.

Application February 17, 1937, Serial No. 126,266

27 Claims. (Cl. 62—114)

My invention relates generally to means for freezing ice cream mixes and the like, and particularly to means of this character arranged to freeze ice cream mix or the like in relatively small quantities for dispensing in still smaller quantities in a discontinuous manner, as in circumstances of making many closely spaced sales or in the circumstances of making a few and scattered sales.

An important object of my invention is to provide apparatus of the character indicated above in which is incorporated means to intermittently feed the mix from the supply of mix to the apparatus in an intermittent manner, the said means involving an arrangement whereby a proportionate amount of air is admitted with the mix for proper mixing and freezing in the apparatus.

Another important object of the present invention is to provide in apparatus of the character indicated above, means for positively predetermining the consistency of the finished product, the said means being operated by the means employed for operating the mixing elements of the device, the said means acting to force a combination of air under pressure and mix into the apparatus and into the presence of the mixing elements in a quantity positively predetermined by preadjustment of said means to determine the rate of feed.

Another important object of the present invention is to provide in apparatus of the character indicated above, means whereby a fractional portion of the mixed and frozen ice cream or the like is admitted into and trapped in a flavoring chamber, whereby only the trapped portion of the body of the mix in the apparatus is flavored, the said chamber having a dispensing device for delivering the contents of the flavoring chamber in wanted quantities.

Another important object of the present invention is to provide flavoring means which can be selectively adjustable to discharge the same flavor continuously into the flavoring chamber in an intermittent manner or a different flavor for each single cycle of freezing, trapping, and dispensing of a quantity of the mixed and frozen ice cream or the like, so that each individual batch receives its own flavoring.

Another important object of the present invention is to provide in apparatus of the character indicated above, flavor dispensing means for the flavoring chamber which may be quickly and easily adjusted to supply a different flavor or flavors to the mixing chamber, in accordance with the flavor requested by the customer.

Another important object of the present invention is to provide in apparatus of the character indicated, means whereby the mix upon entering the mixing and freezing chamber thereof, is conveyed so as to arrive at the inner side of the mixing chamber outer wall, whereby the action of the pump means which supplies the mix to the chamber is assisted by the consequent relief of the back pressure on the pump.

Other important objects of my invention will be apparent from a reading of the following description in connection with the drawings, wherein for purposes of illustration I have shown a preferred embodiment of my invention.

In the drawings:

Figure 1 is a top plan view of the embodiment.

Figure 2 is a longitudinal vertical sectional view through the embodiment.

Figure 3 is a transverse vertical sectional view taken through Figure 2 approximately on the line 3—3 and looking toward the right in the direction of the arrows.

Figure 4 is a right hand elevational view of the embodiment.

Figure 5 is a transverse vertical sectional view taken through Figure 2 approximately on the line 5—5 and looking toward the left in the direction of the arrows.

Figure 6 is a transverse vertical sectional view taken through Figure 2 approximately on the line 6—6 and looking toward the left in the direction of the arrows.

Figure 7 is a fragmentary perspective view of one of the mixing paddles and adjacent scraper as seen on the line 7—7 of Figure 5 and looking upwardly in the direction of the arrows.

Figure 8 is a fragmentary transverse vertical sectional view taken through the upper part of the chamber as shown in Figure 2 and disclosing the arrangement of the scraper and the passage in the left hand end of the chamber which empties into the interior of the chamber.

Figure 9 is a longitudinal sectional view taken through Figure 4 approximately on the line 9—9.

Figure 10 is a transverse vertical sectional view taken approximately on the line 10—10 of Figure 9.

Figure 11 is a right hand end elevational view of the slide shaft showing the flavor selecting notched head thereon.

Figure 12 is a left hand elevational view of the valve cage shown in Figure 9.

Figure 13 is a plan view of one of the flavoring chamber contained piston former disks.

Figure 14 is an enlarged longitudinal vertical sectional view through the mix pumping and air introducing mechanism.

Figure 15 is a perspective view of an intermediate portion of the slide shaft showing the transverse passage therethrough.

Figure 16 is a longitudinal vertical sectional view through the upper part of the chamber as shown in Figure 2 disclosing the arrangement of one of the flexibly mounted scraper blades.

Figure 17 is a transverse vertical sectional view taken through Figure 2 approximately on the line 17—17 and showing the transverse passage in the slide shaft.

Figure 18 is a perspective view of a portion of the flexibly mounted scraper blade.

Figure 19 is a longitudinal vertical sectional view through the cam operated member showing the pawl thereof which acts to operate the mechanism which directly operates the slide shaft.

Referring in detail to the drawings and particularly to Figure 2, the numeral 5 generally designates the cylindrical agitating and freezing chamber having the ends 6 and 7.

Rotatably mounted in this chamber 5 is the agitator which is generally designated 8, which consists of the heads 9 and 10 connected by two bars 11 and 12 which snugly and rotatably engage the circumferential wall of the chamber 5. The bar 11 is provided in its radially outward side with a longitudinally extending and laterally inclined channel 13 receiving the outwardly flexed scraper blade 14, which is urged outwardly of the channel 13 into scraping engagement with the wall of the chamber wall 5 by leaf springs 15 located in the said channel 13.

Projecting radially inwardly from the bars 11 and 12 are the agitating paddles 16, which are rotatably adjustably mounted in openings in the bars in conjunction with set screws 16'. The same may be turned to different angles to the axis of the agitating chamber to accommodate different types of frozen products which would require more or less whipping.

At two longitudinally spaced points circular baffle plates 17 and 18 are mounted between the bars 11 and 12 each being provided with an opening 19 adjacent its periphery. Each of these baffle plates 17 and 18 is provided with a centrally located hub 20 through which the slide shaft 21 slides.

The baffle plates divide the interior of the chamber 5 into separate compartments 22, 23, 24, and the end 7 is spaced from the head 10 to define the flavoring chamber 29.

The shell 25 of the refrigerating means which surrounds the chamber 5 is divided by exterior partitions into a low temperature chamber 26 for quick freezing in the compartment 22, a relatively higher temperature chamber 27 for whipping action in the compartment 23, and the chamber 28 for applying a lower temperature and final freezing to the material in the compartment 24 prior to movement of the material into the flavoring chamber 29.

The numeral 30 designates a refrigerant supply pipe having a branch pipe 31 for each of the chambers 26, 27, and 28, and in each of these branch pipes is a control valve 32 for regulating the amount of refrigerant flowing to the corresponding compartment. In this way the temperature in the various compartments may be accurately varied in accordance with requirements.

The numeral 33 designates the power pulley which has the hollow cam 34 secured to its hub 35. The pulley turns on an integral tubular extension 36' of the chamber end 6. A sleeve 36 extends through the tubular extension 36' and is keyed to the cam 34 and like the tubular extension 36' is provided with a packing gland 37 at its outer end. The slide shaft 21 is slidable through the sleeve 36 and also through the ends 6 and 7 and the heads 9 and 10 of the chamber 5 and agitator 8.

The inner end of the sleeve 36 is keyed, as indicated at 38, to the head 9 of the agitator. The head 9, the sleeve 36, the cam 34, and the pulley 33 rotate together.

A complementary section 21a of the slide shaft 21 is connected by the grooved coupling 39 to the left hand end of the shaft 21 and is threaded through the lost-motion adjusting sleeve 40, which is slidably disposed through the packing gland 41 on one side of the pump housing 42. The pump housing 42 has the piston 43 slidable therein and is provided in the lower part of the left hand head with the air inlet check valve 44, and at the opposite side of the piston with the valved inlet 45 for the ice cream mix or the like.

The enlarged view, Figure 14, clearly shows the piston 43, which is slidable on the smooth portion 21' of the shaft section 21a. The inner end of the sleeve 40 is provided with a counterbore 46, while the extremity of the shaft 21a is provided on the opposite side of the piston with a dished cap 47. A certain amount of lost motion is provided for between the piston and the cap 47 which is subject to micrometer adjustment by adjusting the sleeve 40. Between the inner end of the sleeve 40 and the cap 47 the shaft 21a is bifurcated adjacent the cap 47 so as to provide the opening 48 through which air can pass to enter the valve chamber 49 in which the check valve 67 works when the piston 43 is abutting the sleeve 40.

Inwardly of the valve chamber 49, the shaft 21a is provided with lateral openings 50 connecting the counter bore 46 with the interior of the shaft 21a so that ice cream mix on the right side of the piston 43 can enter the shaft 21a when the piston 43 is abutting the cap 47 and moving toward the right in Figure 14.

Thus it can be seen in Figure 3 that as the pulley 33 is operated by a suitable source of power, the cam 34 is rotated and in riding against the head 51 of the bar 52, drives this bar downwardly against the action of the coiled spring 53. The numeral 54 designates an upstanding bracket having the guides 55 and 56 through which the bar 52 slides. On the bar 52 is a slidable collar 57 which is engageable with the step-cut lower edge of the plate 58, this plate being horizontally adjustable on the bracket 54 so as to bring any one of the progressively reduced steps 59 into a position to be engaged by the collar 57 whereby to step up or set back the reach of the pawl 60 with respect to the ratchet wheel 61. The pawl 60 is arranged to drive the ratchet wheel 61 in a clockwise direction and obviously the amount of movement given this ratchet wheel 61 by each depression of the bar 52 is determined by the advanced or set back position of the plate 58, as aforementioned. This ratchet wheel 61 is rotatably supported by the support 62 and has an eccentrically located pin 63 projecting therefrom and through a slot 64 in the lever 65. As is clearly shown in Figure 1, this lever 65 carries a yoke 66 adjacent its upper free end portion whose arms ride in the opposite sides of the groove of the coupling 39. Obviously, as the ratchet wheel 61 is rotated, the lever is rocked back and forth and thereby imparts reciprocating motion to the slide shaft 21, simultaneously with and coordinated with the speed of rotation of the agitator 8. This sliding motion of the shaft 21 and its sectional extension 21a reciprocates the piston 43 in the housing 42.

When the piston 43 is driven toward the left in Figures 2 or 14, ice cream or other mix is sucked into the housing 42 at the right of the piston through the inlet 45, and as the space within the housing at the left of the piston 43 is reduced and the air therein compressed, the air forces its way through the check valve 67 so that air under pressure enters the main bore of the shaft 21. On the following right hand movement of the piston 43, air is sucked into the space to the left of the piston 43, through the check valve 44, while the ice cream mix at the right of the piston is compressed by the piston and forced through the openings 50 in the shaft 21a and then into the bore of the shaft 21.

While the described operations are taking place at the left hand end of the apparatus, the valving piston generally designated by the numeral 68, on the right hand end of the shaft 21 in Figure 2, operates in a manner to actively control the release of predetermined amounts of frozen material into the flavoring chamber 29.

The construction of the valving piston 68 is shown in Figure 6 and comprises the plates 69 and 70, each of which is provided with a plurality of radially disposed fan-shaped openings 71, the plates being so disposed that the openings of one plate are covered by the spaces between the openings in the other plate, when the plates come together. Each of these plates is provided with cut-out portions 72 at diametrically opposite points to receive the scraper bars 11 and 12. The left hand plate 69 is rigidly secured, as indicated at 73, to the shaft 21 (see Figure 2). The right hand plate 70 is slidable on the shaft and has a hub 74 against which the longitudinally adjustable sleeve 75 is engageable, this sleeve being threaded on the shaft 21 so that it can be micrometrically adjusted to provide the desired lost motion between the sleeve and the right hand plate 70 and thereby determine the desired maximum spacing of the plates. This sleeve 75 is slidable through the end wall 7 of the chamber 5 and its extremity at this end of the machine is operatively engageable with the flavor dispensing mechanism, which is generally designated 76.

The numeral 77 designates the outlet chute for the flavoring chamber and this is provided with a gate 78 normally kept closed by adjustable spring means 79.

Supported by the end wall 7 are the flavor containing reservoirs 80, each of which is provided with a depending neck 81 leading to the corresponding discharge cylinder 82 which empty into the flavoring chamber (see Figure 9). Each of these cylinders 82 involves a threaded plug 83 threaded through the end wall 7 and provided with an internal tubular guide 84 for the stem of the check valve 85, which has its seat inside of the bushing 86 which connects the plug 83 to the corresponding end of the cylinder 82.

Operative inside of the cylinder 82 is the piston 87 which has a seat 88 therein and a cage 89 projecting from one end thereof and in which operates the plunger 90, having the elongated stem 91 which extends slidably through one end of the cylinder 82 and terminates in an adjustable head 92, between which and the corresponding end of the cylinder 82 an expanding helical spring 93 is circumposed on the stem 91 for urging the plunger 90 toward the right end of the cage 89 in Figure 9.

Obviously, when the selectively rotatably adjustable arm 94 on the shaft 21 is carried by left hand movement of the shaft 21, into engagement with the head 92 the stem 91 is pushed inwardly whereby the flavoring present in the cylinder 82 (and which in view of the arrangement of the cage and plunger 90, may contain fruits) is forced through the piston 87. As the plunger 90 strikes the seat 88, the flavoring between the piston 87 and the bushing 86 will be compressed and forced past the check valve 85 and into the flavoring chamber 29. Obviously the discharge of flavoring into the flavoring chamber is discontinuous and intermittent and depends upon the movement of the shaft 21.

The arm 94 is provided with a spring pressed ball 95 which is engageable with any one of the recesses 96 in the shaft 21, which correspond in number and location to the number and location of the flavoring material reservoirs 80, whereby when the ball 95 is engaged with a selected one of the recesses 96, the free end portion of the arm 94 is in a position to engage the head 92 of the corresponding flavor reservoir plunger. A certain amount of lost motion is provided between the heads 92 of the plungers and the arm 94 which is adjustable by turning the head 92.

Referring again to Figure 2, it will be observed that when the ice cream mix and air enters the shaft 21 as a result of the operation of the piston 43, it is forced in a right hand direction through the bore of the shaft and reaches the slot 97 in the shaft 21 which is in communication with the inner ends of the ducts 98 which open at their outer ends at the radially inward side of and in direct contact with the wall of the chamber 5, whereby the mix is at once subjected to the minimum temperature in this part of the freezing chamber.

The openings 19 in the partitions 17 provide for movement of the ice cream from compartment to compartment of the freezing chamber and provide that the ice cream will immediately contact the controlled temperature wall of each successive compartment in making the transit, whereby maximum speed in achieving a predetermined temperature of the corresponding portion of the mix is provided for as the mix enters and leaves the different compartments.

Although I have shown and described a preferred embodiment of my invention, it is to be definitely understood that I do not desire to limit the application of the invention thereto, and any change or changes may be made in the materials, and in the structure and arrangement of the parts, within the spirit of the invention and the scope of the subjoined claims.

Having described the invention, what is claimed as new is:

1. In a freezing machine of the character described, a substantially cylindrical freezing chamber, mix feeding means including a pump, a conduit having a portion axially arranged in said freezing chamber and having communication with said pump, said mix feeding means further including a rotary agitator in said freezing chamber, said agitator having a portion formed with radial passages operating to direct and mix against the walls of the freezing chamber, said portion of the conduit being in communication with the inner ends of said radial passages.

2. In a freezing machine of the character described, a freezing chamber, mix feeding means communicating with said freezing chamber, a rotary agitator in said chamber, said agitator having longitudinally spaced partitions dividing the interior of the freezing chamber into successive compartments, said partitions having their peripheral edges close to but sufficiently spaced from the wall of the freezing chamber to cause a substantial mass of the mix to accumulate in each compartment before passing into the next compartment in forcible contact with the wall of the freezing chamber whereby all of the mix is cooled to the desired temperature before passing into the next compartment.

3. In a freezing machine of the character described, a freezing chamber, mix feeding means including a pump having a reciprocating element, said mix feeding means comprising a slide shaft entering said freezing chamber and having a tubular portion in mix receiving communication with said pump and in mix feeding communication with said freezing chamber, said slide shaft being operatively connected to said reciprocating element of the pump.

4. In a freezing machine of the character described, a freezing chamber, mix feeding means including a pump having a reciprocating element, said mix feeding means comprising a slide shaft entering said freezing chamber and having a tubular portion in mix receiving communication with said pump and in mix feeding communication with said freezing chamber, said slide shaft being operatively connected to said reciprocating element of the pump, a rotary agitator in said freezing chamber, means operatively connecting said agitator and said slide shaft, a coordinating operating connection between said slide shaft and said pump, and drive means operatively connected to said means.

5. In a freezing machine of the character described, a freezing chamber, mix feeding means, said mix feeding means comprising a reciprocable slide shaft extending through said freezing chamber, flavor feeding mechanism at the outlet end of said freezing chamber, and an operating connection between said slide shaft and said flavor feeding mechanism.

6. In a freezing machine of the character described, a freezing chamber, mix feeding means, said mix feeding means comprising a reciprocable slide shaft extending through said freezing chamber, flavor feeding mechanism at the outlet end of said freezing chamber, and an operating connection between said slide shaft and said flavor feeding mechanism, said mix feeding means including a pump operatively connected to said slide shaft, and drive means for reciprocating said shaft.

7. In a freezing machine of the character described, a freezing chamber, mix feeding means communicating with said freezing chamber, an agitator within said freezing chamber, said agitator having longitudinally spaced partitions dividing the interior of said freezing chamber into several successive compartments, refrigerating means engaged with the outside of said freezing chamber, said refrigerating means comprising distinct portions so related to the individual compartments that the individual compartments may be selectively cooled to predetermined temperatures, said distinct portions comprising conduits each having a valve therein for regulating the flow of refrigerant therein.

8. In a freezing machine of the character described, a freezing chamber, mix feeding means in communication with said freezing chamber, partition means dividing the interior of said freezing chamber into several successive compartments having limited communication with each other, an agitator in said freezing chamber for agitating the mix in the freezing chamber as the mix enters the various compartments, said agitator assisting in moving the mix from one compartment to the next succeeding compartment, refrigerating means on the outside of said freezing chamber, said several successive compartments comprising a first quick-freezing compartment, a succeeding higher temperature compartment in which the agitator effects whipping of the mix, and a lower temperature compartment effecting final freezing of the mix, said refrigerating means having distinct portions so related to the individual compartments that the compartments may be cooled to predetermined temperatures, each of said distinct portions comprising a conduit having a valve controlling the flow of refrigerant therein.

9. In a freezing machine of the character described, a freezing chamber having an inlet and an outlet, mix feeding means in communication with said inlet, and flavor dispensing means in receiving relation with said outlet, said mix feeding means having a movable part and said flavor dispensing means comprising a flavor dispensing device and an operating connection between said flavor dispensing device and said moving part of said mix feeding means.

10. In a freezing machine of the character described, a freezing chamber having an inlet and an outlet, mix feeding means in communication with said inlet, flavor dispensing means in receiving relation with said outlet, said mix feeding means having a movable part and said flavor dispensing means comprising a flavor dispensing device and an operating connection between said flavor dispensing means and said moving part of said mix feeding means, said flavor dispensing means comprising a plurality of reservoirs containing different flavors, each reservoir having valved means arranged to discharge flavoring into the mix, said operating connection being adjustable to operate a selected one of said valved means.

11. A freezing machine of the character described, said machine comprising a freezing chamber, an agitator in said freezing chamber, drive means for said agitator, a combined mix and air pump, a slide shaft extending through said freezing chamber and having a bore arranged to conduct air and mix from said pump to the interior of said freezing chamber, said shaft being operatively connected to said drive means, an outlet for said freezing chamber, a valving piston in said outlet and operated by said slide shaft, and means for adding flavoring to the frozen mix.

12. In a freezing machine of the character described, a freezing chamber having an inlet and an outlet, mix feeding means communicating with said inlet, a flavoring compartment with which said outlet communicates, said flavoring compartment having a discharge, a reciprocable slide shaft extending into said flavoring compartment, valve means controlling communication between said outlet and said flavoring compartment, said valve means comprising a piston including a pair of disks having non-registering apertures connected to said slide shaft within said flavoring compartment, one of said disks being fixed to said slide shaft and the other disk slidable thereon toward and away from the fixed disk, whereby operation of the shaft in one direction closes said outlet and pushes the mix already in said flavoring compartment toward the flavoring compartment discharge and when moved in the opposite direction opens said outlet.

13. In a freezing machine of the character described, a freezing chamber having an inlet and an outlet, mix feeding means communicating with said inlet, a flavoring compartment with which said outlet communicates, said flavoring compartment having a discharge, said mix feeding means including a reciprocable member, a reciprocable slide shaft extending into said flavoring compartment and operatively connected to said reciprocable member, valve means controlling communication between said outlet and said flavoring compartment, said valve means comprising a piston including a pair of disks having non-registering apertures connected to said slide shaft within said flavoring compartment, one of said disks being fixed to the shaft and the other disk slidable thereon toward and away from the fixed disk, whereby operation of the shaft in one direction closes said outlet and pushes the mix already in said flavoring compartment toward the flavoring compartment discharge and when moved in the opposite direction opens said outlet, means operatively connecting said slide shaft and said mix feeding means, said means comprising means for adjusting the stroke of the said reciprocable member whereby the rates of feed and discharge of the mix relative to said freezing chamber may be coordinated.

14. In a freezing machine of the character described, a freezing cylinder, pump means for feeding mix and air into said freezing cylinder, said pump means comprising a reciprocable slide shaft passing through said freezing cylinder, a casing having a piston working therein, an operative connection between said piston and said reciprocable slide shaft, said piston having a passage communicating with the interior of the pump casing, said slide shaft having a bore communicating at one end with the interior of said freezing cylinder and at its opposite end with the said passage in said piston, an operating connection between said opposite end of the slide shaft and said pitson, said operating connection comprising lost motion means, said lost motion means being adjustable to predetermine the length of the stroke of said piston relative to the stroke of said reciprocable slide shaft, and drive means for reciprocating said slide shaft and said piston.

15. In a freezing machine of the character described, a freezing chamber, mix feeding means, said mix feeding means comprising a reciprocable slide shaft having a portion extending into said freezing chamber, said slide shaft being formed with a bore discharging in said freezing chamber, a pump comprising a casing and a piston working in said casing, a connection between said slide shaft and said piston, said connection providing communication between the interior of the pump casing and the bore of the slide shaft and affording operative connection between said slide shaft and said piston, a rotary agitator in said freezing chamber turning on said slide shaft, drive means connected to said agitator for rotating the same, and operating means operated by said drive means for imparting reciprocatory motion to said slide shaft.

16. In a freezing machine of the character described, a freezing chamber, mix feeding means, said mix feeding means comprising a reciprocable slide shaft having a portion extending into said freezing chamber, said slide shaft being formed with a bore discharging in said freezing chamber, a pump comprising a casing and a piston working in said casing, a connection between said slide shaft and said piston, said connection providing communication between the interior of the pump casing and the bore of the slide shaft, a rotary agitator in said freezing chamber turning on said slide shaft, drive means connected to said agitator for rotating the same, and other means operated by said drive means for imparting reciprocatory motion to said slide shaft, said connection comprising a lost motion device including axially adjustable elements, micrometer means adjustably connecting said elements, whereby the length of the stroke of said piston relative to the stroke of said slide shaft may be exactly predetermined.

17. In a freezing machine of the character described, a freezing chamber having an inlet and an outlet, mix feeding means in feeding relation to said inlet, a flavoring chamber in receiving relation to said outlet, a flavor reservoir having discharge means emptying into said flavoring chamber, said discharge means comprising a plunger having a head, said head being adjustable along said plunger to predetermine the length of stroke of said plunger and thereby the amount of flavoring passed by said discharge means into said flavoring compartment, said mix feeding means comprising a reciprocatory slide shaft having a portion extending through said flavoring chamber and having a part operatively engageable with said head, and means for reciprocating said slide shaft.

18. In a freezing machine of the character described, a cylinder having an interior transverse partition dividing the same into a freezing chamber and a flavoring chamber, and means establishing controlled communication between said freezing chamber and said flavoring chamber.

19. In a freezing machine of the character described, a freezing chamber having an inlet and an outlet end, mix feeding means comprising a reciprocable slide shaft extending longitudinally through the inlet and outlet ends of said chamber, said slide shaft having a mix conveying bore terminating within said freezing chamber adjacent said inlet end of the freezing chamber, a flavoring compartment on the outlet end of the freezing chamber, opening means establishing communication through said outlet end between said freezing chamber and said flavoring compartment, valve means on said slide shaft within said flavoring compartment for controllably opening and closing said opening means.

20. In a freezing machine of the character described, a freezing chamber having an inlet and an outlet end, a flavoring compartment mounted on said outlet end of the freezing chamber, opening means in said outlet end establishing controlled communication between said freezing chamber and said flavoring compartment, a reciprocatory slide shaft extending through said inlet and outlet ends of the freezing chamber, said slide shaft having a mix conveying bore opening into said freezing chamber adjacent the inlet end thereof, a gate supported in said flavoring compartment for closing and opening said opening means, a first operating connection between said slide shaft and said gate, a flavor reservoir having a discharge leading into said flavoring compartment, a normally closed valve controlling said discharge, and a second operating connection between said slide shaft and said valve.

21. In a freezing machine of the character described, a freezing chamber having an inlet end and an outlet end, a flavoring compartment on the said outlet end of the freezing chamber, said outlet end being formed with an opening establishing communication between said freezing chamber and said flavoring compartment, a reciprocable slide shaft extending through said inlet and outlet ends of the freezing compartment, a valving piston working in said flavoring compartment in controlling relation to the passage of mix through said opening in the outlet end of said freezing chamber into said flavoring compartment, said valving piston comprising a first apertured disk fixed on said part of the slide shaft, a second apertured disk on said part of the slide shaft and slidable toward and away from said first apertured disk and a micrometer collar threaded on said part of the slide shaft at the far side of said second apertured disk for limiting the movement of said second disk away from said first disk as the slide shaft is reciprocated, the apertures of said second disk being circumferentially displaced with respect to the apertures of said first disk.

22. In a freezing machine of the character described, a freezing chamber having an inlet and an outlet, mix feeding means in feeding relation to said inlet, a flavor mixing compartment in receiving relation to the outlet of the freezing chamber, flavoring means for supplying flavor to the said flavor mixing compartment, said flavoring means comprising a plurality of founts each equipped with a normally closed valve discharging into said flavor mixing compartment, each valve having an operating element having a reciprocatory part operatively engageable with said operating elements, said part being adjustable to operate selected ones of said valves.

23. In a freezing machine including a freezing cylinder, pump means for delivering mix and air to said cylinder, said pump including a piston, a reciprocable member having a portion extending axially into said cylinder, said reciprocable member having a bore connecting the pump with the interior of the cylinder, a micrometrically, adjustable lost motion operating connection between said piston and said reciprocable member, operating means connected to said reciprocable member for imparting reciprocating motion thereto and to said piston, said lost motion connection comprising a threaded portion on said reciprocable member, a sleeve threaded thereon, means slidably connecting said reciprocating member with said piston and permitting the adjacent end of said sleeve to engage the adjacent side of the piston on a stroke of the reciprocable member, said sleeve being threadably adjustable along said threaded portion to predetermine the length of the stroke of the piston relative to the stroke of said reciprocable member.

24. In a freezing machine, a freezing chamber, a flavoring compartment into which said freezing chamber discharges mix under pressure, a discharge for said flavoring compartment, a gate normally closing said discharge, and pressure regulating means releasably holding said gate in closed position, said pressure regulating means being adjustable for predetermining the pressure of the mix in the flavoring compartment at which said gate will open.

25. In a freezing machine of the character described, a generally cylindrical freezing chamber, mix feeding means having a portion extending within one end of said freezing chamber, said freezing chamber having a transverse partition adjacent the said opposite end defining a flavoring compartment, said partition having an outlet through which the mix enters the flavoring compartment from said freezing chamber, means establishing controlled communication between said freezing chamber and said flavoring compartment by said outlet.

26. In a freezing machine of the character described, a cylinder, a refrigerating means surrounding and cooling said cylinder, a rotary agitator in said cylinder, said agitator having longitudinally spaced partitions having their peripheral edges spaced close to the interior of the cylinder, said partitions dividing the interior of said cylinder into a quick freezing section, a whipping section, a freezing section, said cylinder having a mix intake opening into said quick freezing section, a flavoring compartment on said cylinder into which said freezing section discharges.

27. In a freezing machine of the character described, a freezing chamber, a rotary agitator head within said chamber, mix feeding means including a pump, a conduit fed by said pump and having a first portion extending longitudinally with respect to said freezing chamber, said conduit having a second portion comprising at least two laterally outwardly extending passages in said agitator head, said passages being connected at their laterally inward ends to said first portion, said passages having their laterally outward ends positioned closely adjacent to the inner surface of the wall of said freezing chamber whereby the mix is discharged directly against the wall of the freezing chamber.

CLARENCE E. RAHAUSER.